Aug. 16, 1927.
W. T. HENSLEY
1,639,500
SPLIT PULLEY
Filed June 18, 1923   2 Sheets-Sheet 1
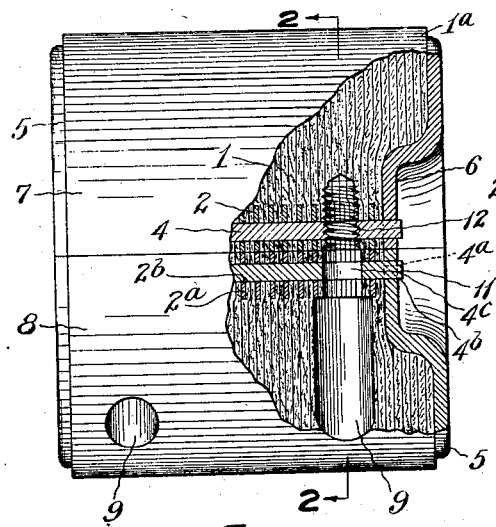
FIG. 1.
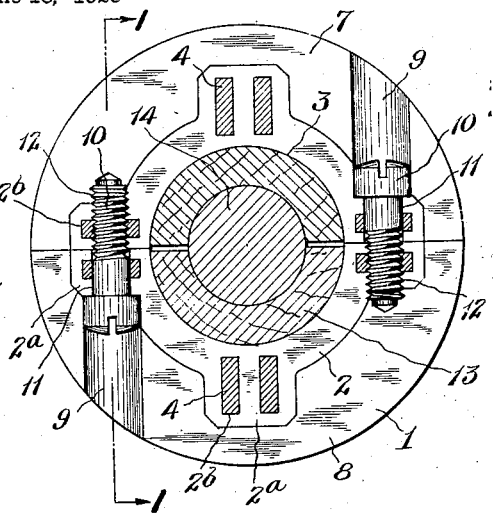
FIG. 2.
FIG. 4.
FIG. 3.
FIG. 6.
FIG. 5.
FIG. 7.
INVENTOR:
WILLIAM T. HENSLEY
BY Lloyd L. Evans
ATTORNEY.

Aug. 16, 1927.

W. T. HENSLEY

SPLIT PULLEY

Filed June 18, 1923

INVENTOR:
WILLIAM T. HENSLEY
BY Lloyd L. Evans
ATTORNEY.

Patented Aug. 16, 1927.

1,639,500

UNITED STATES PATENT OFFICE.

WILLIAM T. HENSLEY, OF INDIANAPOLIS, INDIANA.

SPLIT PULLEY.

Application filed June 18, 1923. Serial No. 646,117.

This invention relates to laminated pulleys in which the body of the pulley is formed by layers of material extending at right angles to the axis of the pulley and more particularly to that type of pulley known as the split pulley.

An object of the invention is to provide a balanced laminated pulley preferably of the paper type which is well adapted for use as a split pulley and which is simple in construction, so that it can be easily clamped about or removed from a shaft supported on bearings with which it is intended to operate, and in which the clamping means is symmetrically disposed.

It is also an object of the invention to provide a symmetrical laminated pulley in which the laminated material is more dense at the inner portion than upon the outer surface, thus providing a relatively soft and maximum frictional surface for engagement with a belt and relatively dense inner portion having a maximum mechanical strength for engagement with a bushing such as is commonly used between split pulleys and the shaft about which the pulley is clamped.

A further object of the invention is to provide a laminated pulley of the split type having a plurality of reinforcing layers of relatively harder material between which the paper laminæ may be compressed, thus providing a relatively dense inner portion without the use of a tubular metallic core or hub, such as is commonly used with paper pulleys.

These and other objects will be apparent from the following description and annexed drawings, in which Figure 1 is a side elevation of a pulley showing a portion thereof in longitudinal section on the line 1—1, Fig. 2.

Fig. 2 is a transverse section on line 2—2, Fig. 1.

Fig. 3 is an end elevation of one half of the split pulley.

Fig. 4 is a longitudinal section on line 4—4, Fig. 3.

Fig. 5 is a perspective view of one of the metal plates used in the structure.

Fig. 6 is a perspective view of one of the rivets.

Fig. 7 is an elevation, partly in section, of a unit used in assembling a pulley.

Figure 8:
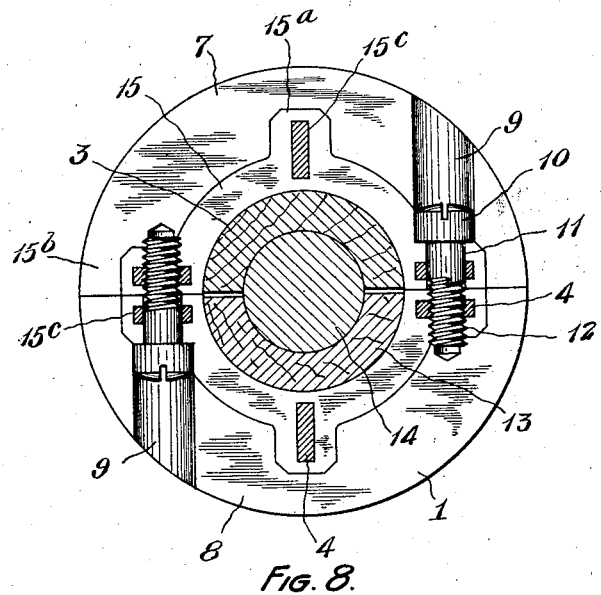
Fig. 8 is a section similar to Fig. 2 but showing a modified form of metal plate.

As shown, the pulley comprises a plurality of plates or disks 1 of fibrous material, such as strawboard or paper or other equivalent material, alternating with the relatively hard plates 2, preferably of metal. The plates 2 are smaller in diameter than the strawboard layers, and the strawboard material between the plates is compressed with a relatively large pressure, thus rendering the inner portion of the pulley adjacent the central bore 3 relatively more dense than the outer surface of the pulley. The metal disks 2 are provided with radially extending wings $2^a$ which are apertured at $2^b$ to receive the metal rivet bars 4. These are symmetrically arranged in pairs around the central aperture so that a balanced structure is provided, the rivet bars being preferably arranged with their largest cross sectional dimension disposed substantially radially of the body of the pulley, so that the pulley is reinforced and rendered more rigid against movement transversely. The plate rivet bars furthermore bind the pulley together and, together with the steel plates 2, which have a relatively large surface engagement with the fibrous laminæ, assist in transmitting the torque to the pulley or to the shaft, depending upon whether the pulley is driven by the shaft or drives the shaft.

In order to make my pulley, the paper and metal plates may be punched, and assembled on an arbor in the manner disclosed in my copending application Serial No. 610,175, filed Jan. 2, 1923, in which is shown diagrammatically a machine for punching the blank strips and automatically assembling a metal plate with a single thickness or with a plurality of thicknesses of paper or other material on an arbor until the required number for a given pulley is assembled, the paper sections being coated with any suitable binder, such as casein glue or sodium silicate, so that they form a substantially uniform mass when pressed together. Preferably each metal plate 1 is pressed into two or more layers of fibrous material until the outer surface of the metal is substantially flush with the paper, thus forming a unit such as shown in Fig. 7. The grain of the paper is also preferably crossed in alternate layers of the fibrous material to ensure greater strength and coherence in the body of fibrous material.

After assembling upon an arbor or core, the rivets 4 with shoulders $4^a$ are inserted in the alined apertures 2$^b$ and the assembly with the end plates 5 is pressed together with a relatively great pressure, such for example as 4 or more tons, the shoulders 4$^a$ acting as limits for the inward movement of the end plates 5 which are perforated to receive only the heads 4$^b$ of the rivets. The end plates have a depressed inner portion 6 and when forced together the inner portion of the pulley will be substantially more compressed than the outer portion. While compressed, the rivet heads 4$^b$ are split as at 4$^c$ by a tool preferably having an annular spreading rib, and spread to hold the pulley while it is dried.

The inner portion of the pulley throughout its length, it will thus be seen, is relatively more dense and has a maximum mechanical strength without the use of a tubular metal hub such as is commonly used. The outer portion of the pulley may not be compressed at all or may be slightly compressed, as desired, to form a relatively soft surface to present a maximum frictional engagement with the belt, the exact degree of hardness being entirely optional with the manufacturer of the pulley.

During the drying operation the paper laminæ shrink permanently, so that they do not have any tendency to expand back into their original position, when the mass is dried, even if the end plates were removed. After the drying operation, the pulley may be placed in a press and the rivets headed over to tightly hold the end plates and permanently shrunk pulley sections together and take up any looseness caused by shrinkage of the fibrous laminæ.

The end plates are shown as having depressed portions which, if sufficiently deep, necessitate the use of laminæ 1$^a$ of fibrous material to serve as fillers at the ends of the pulley. It is to be understood, however, that this construction can be varied and end plates having slight depressions or no depressions may be used if desired.

Counterbores 9 and bores 11 are formed in the pulley in a direction at right angles to each of two pairs of rivets 4, the recesses for each pair being on opposite sides of the pulley and symmetrically arranged, as shown in Figs. 1 and 2. These counterbores 9 extend from the surface of the pulley inwardly to the edge portions of a plurality of the rivet holding extensions 2$^a$ of the metal plates 2. The holes 11 are bored through the laminæ 1 and 2 and the rivets 4. The rivets more remote from the counterbore 9 are threaded at 12 to receive screws 10, the plates 2 also being threaded, as shown in Fig. 1. The pulley is then split diametrically into two halves between the apertured rivets, so that two identical pulley sections 7 and 8 are formed which can be easily clamped together by using the securing screws 10 and passing them through the recesses 11 to engage threaded portions 12 of the rivets and plates in the opposite section.

Figure 9:
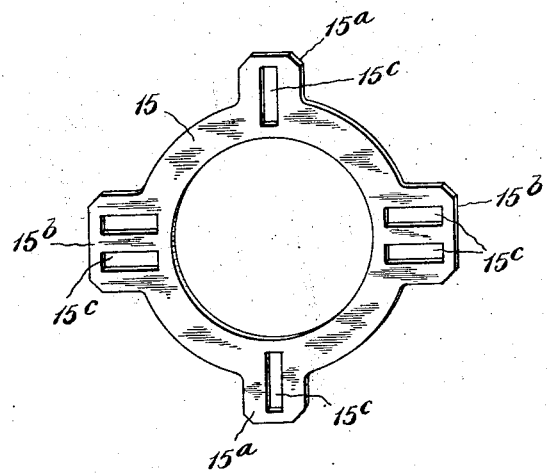
Fig. 9 is perspective of the plate itself.

In Figs. 8 and 9 a metal disk 15 is shown, which, instead of being symmetrical in two directions so that the pulley can be split in either of two planes 90° apart, is designed to use only one rivet substantially radially disposed intermediate the opposed faces of a pulley segment. The plate as shown has wide wings 15$^b$ and narrower wings 15$^a$, the former being perforated to receive two rivets and the latter to receive only one.

It will thus be seen that the threaded portion to receive the screws 10 not only extends through the rivet bar 4 but good threads are formed throughout extensions 2$^a$ of the metal plates 2 which substantially increases the length of the threaded recess so that the screws 10 bind the sections of the pulley firmly together.

It will also be seen that with my construction the parts of the pulley may be easily clamped about the sleeve or bushing 13 commonly used with the split type pulleys to secure them for power transmitting purposes to a shaft 14.

Attention is also called to the fact that with my design of split pulley the entire pulley is formed and worked automatically similar to the one piece pulleys fixed or keyed to a shaft, and that the surface is finished in the same manner, as by turning, in which case the outer surface may be cylindrical or crowned, as desired. The only operations not performed in the one piece type pulley are the boring and threading to receive the securing screws 10, and splitting the pulley into two sections to be clamped together.

The preferred method of making the pulley is to assemble units preferably square or polygonal such as shown in Fig. 7 and form a complete cylindrical pulley which is bored and threaded for the clamping screws before the pulley is sawed or split into halves. It is obvious, however, that the units could easily comprise segments or halves of those shown in Fig. 7. That is, the metal plates and layers of fibrous material could be formed of a size for a pulley segment or half section, and pressed together to make units which when assembled, dried and riveted, would form only a half pulley section. Two such sections, if desired, can be clamped together to be finished to form a section such as the section 7 or 8. As these pulley sections are identical in construction, any two could then be clamped together about a shaft to form a complete pulley.

It will thus be seen that I have provided a relatively simple and inexpensive split pulley construction which is easily applied to or removed from a shaft, and which is symmetrical and balanced, and in which the torque is evenly transmitted to the body of the pulley from the relatively dense inner portion of the pulley, or in the opposite direction, depending upon whether the power is being transmitted to the pulley from the shaft or vice versa.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A laminated, split pulley for power transmission comprising a plurality of segments adapted to be detachably secured together about a suitable bushing or shaft, said segments each comprising segmental laminæ of fibrous material and segmental plates of relatively hard material of less radial dimension, means passing through said plates to hold the laminæ in compressed condition, and means for clamping said segments together.

2. A laminated, split pulley for power transmission comprising a plurality of segments adapted to be detachably secured together about a suitable bushing or shaft, said segments each comprising segmental laminæ of fibrous material, means to hold the laminæ in compressed condition, and means for clamping said segments together.

3. A split, laminated pulley for power transmission comprising laminæ of relatively soft fibrous material and relatively hard plates, the inner portions of the fibrous material being compressed to form a relatively dense interior for engagement with a shaft or bushing, and means symmetrically arranged around the pulley to clamp the pulley sections together upon such shaft or bushing.

4. A split pulley for power transmission comprising two substantially identical, symmetrical sections formed of laminæ of fibrous material and having a relatively dense inner portion and relatively soft frictional outer portion, means embedded in the pulley sections and extending longitudinally thereof, and means for detachably clamping the sections together about a shaft.

5. A pulley for power transmission comprising a plurality of laminæ of relatively soft fibrous material and a plurality of plates of less radial dimension, the laminæ of fibrous material between the plates being compressed, means extending longitudinally through the laminæ to hold the laminæ in compressed condition, said plates and holding means being symmetrically arranged circumferentially to provide a balanced pulley, said pulley being adapted to be split to engage a shaft or bushing for power transmission.

6. A structure as specified in claim 5, said holding means comprising rivet bars axially arranged in pairs circumferentially, whereby said pulley may be split axially between each pair of two opposed pairs of rivet bars, and securing means adapted to pass through a rivet bar in each pulley section and engage an opposed rivet bar of the opposite section.

7. A structure specified in claim 5, in which said plates are perforated and in which said holding means comprise rivet bars passing through said perforations.

8. A pulley for power transmission comprising a plurality of laminæ of relatively soft fibrous material and a plurality of plates of less radial dimension, the laminæ of fibrous material between the plates being compressed, end plates for said pulley, and means to hold the end plates against said fibrous material, said holding means connecting all of said plates and being symmetrically arranged in pairs circumferentially to provide a balanced pulley, said pulley being adapted to be split into two parts, and clamping means to clamp the parts together about a shaft, said clamping means being also symmetrically arranged.

9. A split pulley for power transmission comprising two parts of substantially identical construction, each part having a plurality of laminæ of fibrous material, metal plates between certain layers of fibrous material compressed to form a relatively dense inner portion, said plates being of less radial dimension than said fibrous material, whereby the outer portion of said pulley presents a relatively frictional surface for power transmission, and clamping means to clamp said sections together about a shaft, the arrangement of the plates and clamping means being symmetrical, so that a balanced pulley is produced.

10. A split pulley for power transmission comprising a plurality of units of fibrous material and relatively harder plates of less radial dimension, means to hold said units together, said fibrous material being permanently compressed to form a relatively dense inner portion and a relatively softer outer portion for frictional engagement for power transmission, and means for detachably securing said units together about a shaft.

11. A pulley for power transmission comprising a plurality of laminated segmental sections, each comprising fibrous laminæ alternating with sheet metal laminæ, the sheet metal laminæ comprising segmental plates and the fibrous laminæ consisting of segmental layers extending beyond the outer edges of the metal laminæ to form the peripheral surface of the pulley, and means to detachably hold said segmental sections together.

12. The method of making a laminated split pulley which comprises assembling relatively soft laminæ and relatively hard laminæ of less radial dimension, compressing and holding said laminæ to form a complete pulley, and thereafter cutting said pulley into segments adapted to be clamped together about a shaft to form a complete pulley.

13. The method of making pulleys comprising forming units of fibrous sheet material and metal plates of less radial dimension pressed into the surface of the fibrous material, assembling said units and securing them together, forming cooperating clamping portions, and cutting said pulley into segments adapted to be clamped together to form a complete split pulley.

14. The method of making a laminated split pulley which comprises assembling relatively soft laminæ and relatively hard laminæ of less radial dimension together, passing rivets through said hard laminæ in a symmetrical relation, compressing the inner portions of said laminæ together axially, spreading the ends of said rivets to hold said laminæ, splitting said pulley into a plurality of parts, and providing clamping means for clamping the parts about a shaft.

15. The method of making pulleys, comprising the cutting of sheet material into segmental laminæ, assembling the segmental laminæ into a plurality of complete pulley segments, and thereafter combining the laminated pulley segments to maintain the peripheral continuity of the pulley.

16. A method as specified in claim 15, comprising the finishing of the periphery of the pulley after the laminated sections have been coupled together.

17. A method as specified in claim 15, comprising the compression and permanent shrinkage of the laminated pulley segments before they are coupled together.

18. A method as specified in claim 15, comprising the use of relatively small metal segmental laminæ, with fibrous layers alternating therewith, the sheet metal segmental laminæ of the different pulley sections combining to form a relatively dense inner portion to engage a shaft.

19. A split pulley of the fibrous character described including a plurality of similar blank forming layers, a plurality of bars longitudinally embedded therein and extending through said plurality of layers, and means engaging said bars for drawing cooperating bars together to form a united split pulley after splitting.

20. A split pulley of the fibrous character described including a plurality of fibrous split pulley sections, a bar embedded in each pulley section and extending longitudinally thereof and to a side thereof, means engaging said bars for drawing the bars of adjacent pulley sections together, an end plate adapted to lie adjacent the same, and means securing said end plate to said longitudinally extending bars.

21. A split pulley of the fibrous character described including a plurality of fibrous split pulley sections, a plurality of bars embedded in each pulley section and extending longitudinally thereof and to the sides thereof, means engaging said bars for drawing the bars of adjacent pulley forming portions together, a pair of end plates adapted to lie adjacent the same, and means securing said pair of end plates to said bars.

22. A split pulley of the fibrous character described including a plurality of fibrous layers in pulley forming formation, said pulley formation including a plurality of pulley sections, a longitudinally extending bar embedded in each pulley section, and means engaging said bars for drawing together the bars in adjacent sections for detachably securing the latter together to form a split pulley.

23. A split pulley construction including a plurality of pulley forming sections, a bar permanently embedded in each section intermediate the periphery and central mounting thereof, one of said bars having a threaded portion, and a bolt receivable by the other bar and having a threaded engagement with the threaded bar for drawing the sections together.

24. A split pulley of the fibrous character described including a plurality of fibrous split pulley sections, a plurality of bars embedded in each pulley section and extending longitudinally thereof and to a side thereof, means engaging said bars for drawing the bars of adjacent pulley sections together, an end plate adapted to lie adjacent the same, and means securing said end plate to said longitudinally extending bars.

25. A split pulley construction including a plurality of pulley forming sections, a plurality of bars each permanently embedded in each section intermediate the periphery and central mounting thereof, one of said bars having a threaded portion and a bolt receivable by the other bar and having a threaded engagement with the threaded bar for drawing the sections together.

26. A fibrous split pulley comprising a plurality of substantially similar blank forming fibrous sections each containing a plurality of bars longitudinally positioned therein and substantially enclosed thereby, and means passing from bar to bar and through the intervening pulley portion for detachably securing the bars of adjacent sections to form a split pulley.

27. A split pulley of the fibrous character described including a plurality of fibrous pulley sections, each containing a plurality of bars therein, and means engaging said bars for drawing the bars of adjacent pulley sections for detachably securing them in pulley formation.

28. A split pulley of the fibrous character described including a plurality of fibrous layers arranged in pulley forming formation, said pulley formation including a plurality of pulley sections, a longitudinally extending bar embedded in each pulley section, and a plurality of means engaging each bar for drawing the same to another pulley section bar for detachably securing the pulley sections together to form a split pulley.

29. A fibrous split pulley comprising a plurality of substantially similar blank forming fibrous sections each containing a bar longitudinally positioned therein and substantially enclosed thereby, and means passing from bar to bar and through the intervening pulley portion for detachably securing the bars of adjacent sections to form a split pulley.

30. A split pulley of the fibrous character described including a plurality of fibrous split pulley sections, a bar embedded in each pulley section and extending longitudinally thereof and to the side thereof, means engaging said bars for drawing the bars of adjacent pulley sections together and a pair of end plates adapted to lie adjacent to same, and means securing said end plates to said bars.

31. A split pulley of the fibrous character described including a plurality of fibrous layers in pulley formation, said pulley formation including a plurality of pulley sections, a plurality of longitudinally extending bars embedded in each pulley section, and means engaging said bars for drawing together the bars in adjacent sections for detachably securing the latter together to form a split pulley.

32. A split pulley of the fibrous character described including a plurality of fibrous layers arranged in pulley forming formation, said pulley formation including a plurality of pulley sections, a plurality of longitudinally extending bars embedded in each pulley section, and a plurality of means engaging each bar for drawing the same to another pulley section bar for detachably securing the pulley sections together to form a split pulley.

In testimony whereof, I hereunto affix my signature.

WILLIAM T. HENSLEY.